United States Patent [19]

Engstrom

[11] Patent Number: 5,154,910
[45] Date of Patent: Oct. 13, 1992

[54] PROCESS FOR THE PRODUCTION OF CHLORINE DIOXIDE

[75] Inventor: Jorgen Engstrom, Bergeforsen, Sweden

[73] Assignee: Eka Nobel AB, Bohus, Sweden

[21] Appl. No.: 721,892

[22] Filed: Jun. 27, 1991

Related U.S. Application Data

[63] Continuation-in-part of Ser. No. 647,048, Jan. 29, 1991, abandoned.

[30] Foreign Application Priority Data

Jun. 27, 1990 [SE] Sweden .................................. 9002262

[51] Int. Cl.$^5$ ............................................... C01B 11/02
[52] U.S. Cl. ...................................... 423/478; 423/479
[58] Field of Search ........................ 423/478, 479, 241

[56] References Cited

U.S. PATENT DOCUMENTS

| 2,043,284 | 6/1936 | Cunningham et al. | 423/478 |
| 2,871,097 | 1/1959 | Rapson | 423/478 |
| 3,563,702 | 2/1971 | de Vere Partridge et al. | 423/478 |
| 3,864,456 | 2/1975 | Winfield et al. | 423/478 |
| 3,896,213 | 7/1975 | Hirdler | 423/241 |
| 3,933,988 | 1/1976 | Rosen | 423/478 |
| 4,081,520 | 3/1978 | Swindells et al. | 423/478 |
| 4,216,195 | 8/1980 | Jaszka et al. | 423/478 |
| 4,678,654 | 7/1987 | Holmström et al. | 423/478 |
| 4,770,868 | 9/1988 | Norell | 423/479 |
| 4,873,297 | 10/1989 | Rengstl | 525/474 |
| 4,978,517 | 12/1990 | Norell et al. | 423/479 |

FOREIGN PATENT DOCUMENTS 0366636 5/1990 European Pat. Off. .
453745 2/1988 Sweden .

*Primary Examiner*—John Niebling
*Assistant Examiner*—Brian M. Bolam
*Attorney, Agent, or Firm*—Burns, Doane, Swecker & Mathis

[57] ABSTRACT

A process for the production of essentially chlorine free chlorine dioxide whereby a flow of chlorine dioxide obtained from reduction of alkali metal chlorate and containing by-product of chlorine gas is absorbed in water and the chlorine gas is treated with formic acid in the water solution. The formic acid is added in an amount resulting in a mole ratio formic acid to chlorine gas of $>1:1$.

8 Claims, No Drawings

PROCESS FOR THE PRODUCTION OF CHLORINE DIOXIDE

CROSS-REFERENCE TO RELATED APPLICATION

This application is a continuation-in-part of application Ser. No. 07/647,048, filed Jan. 29, 1991, and now abandoned.

BACKGROUND OF THE INVENTION

The present invention relates to a process for the production of essentially chlorine free chlorine dioxide. The chlorine dioxide is produced by reduction of an alkali metal chlorate with a reducing agent in the presence of a mineral acid. The gaseous chlorine dioxide is absorbed in water. According to the invention the content of chlorine in the chlorine dioxide water is reduced by reaction with formic acid.

Chlorine dioxide used in aqueous solution is of a considerable commercial interest, mainly in pulp bleaching, but also in water purification, fat bleaching, removal of phenols from industrial wastes, etc. It is therefore desirable to provide processes in which chlorine dioxide can be efficiently produced.

It is known to produce chlorine dioxide by reduction of alkali metal chlorate in a water based acid reaction medium. Different reducing agents have been used. Older processes usually use chloride ions as the reducing agent as, e.g., in U.S. Pat. Nos. 3,563,702 and 3,864,456. The basic chemical reaction involved in such processes can be summarized by the formula $$ClO_3^- + Cl^- + 2H^+ \rightarrow ClO_2 + \tfrac{1}{2}Cl_2 + H_2O \tag{1}$$

The chlorate ions are provided by alkali metal chlorate, preferably sodium chlorate, the chloride ions by alkali metal chloride, preferably sodium chloride, or by hydrogen chloride, and the hydrogen ions are provided by mineral acids, generally sulfuric acid and/or hydrochloric acid.

At the production of $ClO_2$ with chloride ions as the reducing agent according to the formula (1) half a mole of chlorine gas is formed for each mole of chlorine dioxide. This by-product of chlorine gas has previously been used together with the chlorine dioxide in the bleacheries of the paper mills. However, increased environmental demands have brought about the change over to pure chlorine dioxide bleaching in industry. To achieve this there is a need for production processes for chlorine dioxide which do not produce chlorine as a by-product.

One method as, e.g., described in U.S. Pat. No. 4,678,654, is based on reduction with chloride ions according to the formula (1) and combined with a subsequent reactor for t ransformation of chlorine gas with sulfur dioxide to a mixed acid according to the formula:

$$Cl_2 + SO_2 + 2H_2O \rightarrow 2HCl + H_2SO_4 \tag{2}$$

This process has a high efficiency, but still small amounts of chlorine are obtained in the chlorine dioxide water. This is due to the fact that the absorption of chlorine dioxide, from the reactor, from the gas mixture consisting of chlorine dioxide, chlorine gas and water vapor is not completely selective. Normally 0.2–2.0 g chlorine gas per liter chlorine dioxide water is obtained, or more commonly 1.0–1.8 g/l.

It is also known to use other reducing agents than chloride ions for chlorine dioxide production, reducing agents which do not produce chlorine at the reaction. According to U.S. Pat. No. 3,933,988 sulfur dioxide is used and according to U.S. Pat. No. 4,081,520 methanol is used as the reducing agent. These reducing agents are indirect reducing agents. The chlorate reduction is achieved through chloride ions according to formula (1). The chloride ions are obtained by reduction of chlorine gas with methanol according to the formula:

$$CH_3OH + 3Cl_2 + H_2O \rightarrow 6Cl^- + CO_2 + 6H^+ \tag{3}$$

or with sulfur dioxide according to the formula (2). Methanol as well as sulfur dioxide are volatile reducing agents which are easily desorbed in the reactor. The utilization of methanol in known processes is often very low due to by-reactions and because a part of the methanol leaves the reactor without having reacted. As the reduction proceeds by chloride ions it is often necessary to continuously add a small amount of chloride ions to obtain a smooth production. Then chlorine gas is easily obtained as a by-product.

U.S. Pat. No. 4,770,868 suggest an improved process for the addition of the methanol whereby the utilization of methanol increases essentially. However, small amounts of chlorine gas is obtained in the chlorine dioxide water also with the most effective processes. So far this has been accepted by the users of chlorine dioxide, but with increasing environmental consciousness the environmental demands are further tightened up and there is a need to remove also the last residue of chlorine gas from the chlorine dioxide water.

Many attempts have been made to completely remove chlorine from chlorine dioxide. Several patents describe purification of chlorine dioxide from chlorine by reaction of chlorine with different chemical substances. For example, U.S. Pat. Nos. 2,043,284 and 2,871,097 mention purification by reaction with chlorite or a mixture of chlorite and chlorate respectively. It is characteristic for the processes that a gaseous flow of chlorine-chlorine dioxide is made to react with the chlorite or chlorite-chlorate mixture respectively. However, none of the known processes has been found to be commercially useful, among other things due to by-reactions and to the fact that it has not been possible to carry them out with good economy.

Another process for purification of chlorine dioxide from chlorine with chlorite is known from SE 453,745. In this process the water solution of chlorine dioxide containing chlorine is treated with the chlorite. The method results in a very effective process with a low residue content of chlorine. However, there is still the drawback that the chlorite is a relatively expensive chemical.

The present invention as it appears from the claims now provides a process for production of chlorine free chlorine dioxide according to which process a flow of chlorine dioxide obtained from reduction of alkali metal chlorate and containing by-product of chlorine gas, is absorbed in water, and the chlorine gas is treated in the water solution with formic acid by addition of this to the water or to the water solution. The addition of formic acid is made in addition to any existing by-product of formic acid from the chlorine dioxide production. With this method the chlorine gas is removed in an effective way but with a considerably cheaper chemical than in known processes. Surprisingly it has been found that the chlorine can be reduced to chloride with formic acid in the chlorine dioxide water without the chlorine dioxide being appreciably influenced at the same time. The reduction can be described with the following formula:

$$Cl_2 + HCOOH \rightarrow 2H^+ + 2Cl^- + CO_2$$

Tests showed that the rate for the reduction of chlorine gas is directly proportional to the concentration of formic acid but inversely proportional to the acid strength of the solution. This means that the more formic acid that is added the faster the chlorine gas reduction becomes. The reduction of chlorine gas is also faster at low acid strengths than at high, which is the opposite condition compared with the chlorate reduction which is faster at high acid strengths irrespective of reducing agents.

The process according to the invention can be used on all types of water with chlorine gas pollution, but preferably the process is used to eliminate chlorine gas from chlorine dioxide water. The process can be used for eliminating chlorine from chlorine dioxide water irrespective of content of chlorine in the chlorine dioxide water and irrespective of method of production of the chlorine dioxide. The process offers a cheap and effective way to eliminate small as well as large amounts of chlorine by-product. The amount of by-product of chlorine produced depends on several parameters. As mentioned above, the reducing agent used is of great importance. When chloride ions are used as the main reducing agent more chlorine gas is obtained than with methanol as the reducing agent. Other parameters which have an influence are the operational conditions at the chlorine dioxide production. Variations in acid strength and temperature and pressure influence the chlorine gas formation.

The amount of formic acid to be added is thus dependent on the content of chlorine gas in the water to be treated and also on the size of the reduction of the chlorine which is desired. The amount of formic acid to be added is also dependent on how fast reduction that is required and at which temperature and pH value the treatment is carried out. If the reducing agent used in the chlorine dioxide process has resulted in formic acid as a by-product as, e.g., methanol may do, this formic acid will usually leave the process with the chlorine dioxide water. The addition of formic acid in the present process is made in addition to this amount of formic acid that may exist. In those cases when the by-product of formic acid is sufficient to remove the formed chlorine gas it is not necessary to add formic acid to the chlorine dioxide water as this then do not contain any chlorine gas. Neither is this case comprised in the invention. Suitable amounts can easily be determined by the skilled man for each different case. As general outlines can be mentioned that when all chlorine gas shall be reduced formic acid should be added in an amount giving a mole ratio of formic acid to chlorine gas >1:1 as the reaction is so slow at a ratio of 1:1 that there will not be time enough for all chlorine gas to react at normal times for the storage of the chlorine dioxide water. With a mole ratio, formic acid to chlorine gas, of about 12:1 the reaction is so quick that the content of chlorine is lowered to 2& of the original value in less than half an hour. These mole ratios are valuable for a treatment temperature of about 10° C. and a pH of about 2.2. An excess of formic acid results in formic acid as a residue in the chlorine dioxide water as all acid will not be consumed by the chlorine gas reduction. However, this does not bring about any disadvantage as the reaction between chlorine dioxide and formic acid is very slow. At normal storage times for the chlorine dioxide water no appreciable reduction of the chlorine dioxide water with the remaining formic acid takes place. Therefore the amount of added formic acid is decided from how fast a reaction that is required and to what content the chlorine gas should be reduced and also with regard to the cost for the formic acid.

The actual treatment of the chlorine dioxide water must be chosen from the production situation in question for the chlorine dioxide. Usually the flow of chlorine dioxide departing from the generator is absorbed in water in an absorption tower. From the absorption tower the chlorine dioxide water is brought to storage tanks before it is used. The formic acid can be added to the water before absorption of the chlorine dioxide flow, thus to the water which is used in the absorption tower. Another possibility is to add the formic acid to the water after absorption of the chlorine dioxide flow and thus add it to the chlorine dioxide water in the storage tanks. The temperature for the treatment with formic acid is not critical but the temperature of the chlorine dioxide water should not exceed 30° C. with regard to the solubility of the chlorine dioxide in the water. A suitable pH for the treatment is the pH value the chlorine dioxide water obtains naturally when the chlorine impurity is dissolved which value is about 2.2. It is true that an increase of the pH of the chlorine dioxide water by addition of alkali should increase the rate of chlorine gas reduction, but the chlorine dioxide water is more stable at lower pH values therefore an increase of the pH of the water would bring about an increased decomposition of chlorine dioxide.

The process according to the invention can be used in connection with manufacturing of chlorine dioxide for all known chlorine dioxide processes. A common process for production of chlorine dioxide, which the present invention advantageously can be used together with, is performed in a single reaction vessel, generator-evaporator-crystallizer. Alkali metal chlorate, mineral acid and the reducing agents are continuously added to the reaction vessel and the reaction is operated at a temperature from about 50° to about 100° C. and with an acid strength of from about 2 to about 12N and at a pressure below atmospheric pressure, suitably at 60–400 mm Hg. The reaction medium will hereby boil and water is evaporated and withdrawn continuously together with the formed chlorine dioxide and chlorine gas. The crystals of the salt of the mineral acid are withdrawn from the crystallization region. At low acid strengths catalysts are suitably used.

The invention will now be illustrated by the following examples which, however, are not intended to limit it. Parts and percentages relate to parts by volume and percent by volume unless otherwise stated.

EXAMPLE 1

To a gas tight reactor containing 4.90 gpl $ClO_2$ and 0.19 gpl $Cl_2$ with a total volume of 100 ml 60 μl HCOOH were added. Thus, an initial content of formic acid of 0.75 gpl was obtained in the reactor which corresponds to a mole ratio formic acid to chlorine gas of 6.1:1. The temperature was kept constant at 10° C. and the pH was about 2.2. Then samples were taken out during predetermined intervals during a period of time of totally 300 minutes and were analyzed regarding chlorine dioxide and chlorine. The content of chlorine in the reactor has decreased to below 5% of the initial content already after a reaction time of 50 minutes. However, after 300 minutes the content of chlorine dioxide has decreased with only 2%.

EXAMPLE 2

A test was performed in accordance with Example 1, but with the difference that the initial content of chlorine dioxide was 4.96 gpl, the content of chlorine 0.53 gpl and the amount of added formic acid 123 $\mu$l. In this way an initial content of formic acid of 1.50 gpl was obtained in the reactor which corresponds to a ratio formic acid to chlorine gas of 4.4:1. The temperature was 10° C., pH about 2.2. The method of taking samples was the same as earlier during a period of time of totally 350 minutes. The content of chlorine has decreased to 2% of the initial concentration after 60 minutes. The content of chlorine dioxide has decreased with 7% after 350 minutes.

EXAMPLE 3

One additional test was performed in accordance with Example 2 with the difference that the amount of added formic acid was 61 $\mu$l resulting in an initial formic acid concentration of 0.75 gpl which corresponds to a mole ratio formic acid to chlorine gas of 2.2:1. The content of chlorine was about 2% of the initial concentration after 180 minutes. However, the content of chlorine dioxide was decreased with only 4% after 360 minutes.

What is claimed is:

1. A process for producing essentially chlorine free chlorine dioxide, comprising the steps of reducing alkali metal chlorate to thereby form chlorine dioxide and by-product chlorine, absorbing the chlorine and chlorine dioxide in water to form an aqueous solution, and treating the absorbed chlorine with formic acid added to the water or to the aqueous solution, thereby removing the chlorine from the water solution, wherein the added formic acid is in addition to any existing formic acid by-product from the chlorine dioxide production.

2. A process according to claim 1, wherein formic acid is added in an amount sufficient to result in a mole ratio of formic acid to chlorine of greater than 1:1.

3. A process according to claim 1, wherein the formic acid is added to the water prior to absorption of chlorine and chlorine dioxide.

4. A process according to claim 2, wherein the formic acid is added to the water prior to absorption of chlorine and chlorine dioxide.

5. A process according to claim 1, wherein the formic acid is added to the aqueous solution after absorption of the chlorine and chlorine dioxide.

6. A process according to claim 2, wherein the formic acid is added to the aqueous solution after absorption of the chlorine and chlorine dioxide.

7. A process according to claim 1, wherein the pH of the aqueous solution during the formic acid treatment step is that resulting naturally from absorption of the chlorine.

8. In a process for the production of chlorine dioxide by the reduction of an alkali metal with a reducing agent in the presence of a mineral acid, the process producing a mixture of chlorine and chlorine dioxide, the steps of:
   (a) absorbing the mixture of chlorine and chlorine dioxide in water solution; and
   (b) contacting the absorbed chlorine with formic acid in the water solution, the formic acid being present in an amount sufficient to reduce essentially all the absorbed chlorine to chloride ion;
   wherein the formic acid of step (b) includes formic acid added to the water solution and which is in addition to any existing formic acid by-product from the chlorine dioxide production.

* * * * *